(12) United States Patent
Sakamoto

(10) Patent No.: US 9,798,690 B2
(45) Date of Patent: Oct. 24, 2017

(54) CONNECTION EQUIPMENT AND A FIELD DEVICE CONTROL SYSTEM

(71) Applicant: YOKOGAWA ELECTRIC CORPORATION, Musashino-shi, Tokyo (JP)

(72) Inventor: Hideyuki Sakamoto, Singapore (SG)

(73) Assignee: Yokogawa Electric Corporation, Musashino-shi (JP)

( * ) Notice: Subject to any disclaimer, the term of this patent is extended or adjusted under 35 U.S.C. 154(b) by 291 days.

(21) Appl. No.: 14/500,078

(22) Filed: Sep. 29, 2014

(65) Prior Publication Data

US 2016/0092386 A1  Mar. 31, 2016

(51) Int. Cl.
| G06F 13/38 | (2006.01) |
| G06F 13/42 | (2006.01) |
| G05B 19/042 | (2006.01) |

(52) U.S. Cl.
CPC ....... *G06F 13/387* (2013.01); *G05B 19/0423* (2013.01); *G06F 13/426* (2013.01); *G05B 2219/25139* (2013.01); *G05B 2219/25462* (2013.01); *G05B 2219/34421* (2013.01)

(58) Field of Classification Search
CPC .......................................... G05B 2219/25428
See application file for complete search history.

(56) References Cited

U.S. PATENT DOCUMENTS

| 7,814,275 B2 * | 10/2010 | Lu ........................... G06F 3/061 710/13 |
| 8,374,094 B2 | 2/2013 | Law et al. |
| 8,379,546 B2 | 2/2013 | Schleiss et al. |
| 8,762,618 B2 | 6/2014 | Burr et al. |
| 2008/0126665 A1 * | 5/2008 | Burr ..................... G05B 19/042 710/316 |
| 2008/0154387 A1 * | 6/2008 | Nambu ................ H01R 13/639 700/3 |

(Continued)

FOREIGN PATENT DOCUMENTS

| DE | 10 2010 060 697 A1 | 5/2011 |
| JP | 2006-163490 A | 6/2006 |

(Continued)

OTHER PUBLICATIONS

European Search Report dated Jun. 1, 2016, issued in counterpart European Patent Application No. 15187327.0. (13 pages).

(Continued)

*Primary Examiner* — Farley Abad
(74) *Attorney, Agent, or Firm* — Oblon, McClelland, Maier & Neustadt, L.L.P.

(57) ABSTRACT

A connection equipment (IJB 200) for connected to a control system (205) via a cable (206) and a field device (201) via a terminal port (306), comprising: a processor (300) configured to determine the terminal port corresponding to the field device reference included in a communication signal received from the control system and to instruct a transmitter/receiver (304) to transmit the communication signal to the terminal port determined, and an isolator (305B) configured to electrically isolate the communication signal to be transmitted to the field device via the terminal port and the electric power signal to be provided to the field device via the terminal port, from the other terminal ports.

18 Claims, 12 Drawing Sheets

(56) References Cited

U.S. PATENT DOCUMENTS

2009/0222885 A1* 9/2009 Batke .................. H04L 63/061
 726/1
2011/0126142 A1 5/2011 Zhou et al.
2014/0269744 A1 9/2014 Flanders et al.

FOREIGN PATENT DOCUMENTS

JP 2008-077660 A 4/2008
JP 2010-170550 A 8/2010

OTHER PUBLICATIONS

Delta V Product Data Sheet S-Series Electric Marshalling, EMERSON Process Management (May 2014).
Notification of Reasons for Refusal issued in corresponding Japanese Application No. 2014-211626 dated May 23, 2017.

* cited by examiner

FIG. 4

| Terminal Port ID | Field Device Type | Field Device Reference | Unique Field Device Reference |
|---|---|---|---|
| Terminal Port 1 | AO Device | #A | 1A1A1A1A1A |
| Terminal Port 2 | -- | -- | -- |
| Terminal Port 3 | AO Device | #B | 2B2B2B2B2B |
| Terminal Port 4 | -- | -- | -- |
| Terminal Port 5 | -- | -- | -- |
| Terminal Port 6 | AI Device | #C | 3C3C3C3C3C |
| Terminal Port 7 | -- | -- | -- |
| Terminal Port 8 | AI Device | #D | 4D4D4D4D4D |

FIG. 11

| Source of request | Type of request | Type of response | Destination |
|---|---|---|---|
| Control system | Parameter type/ process values | Parameter type/ process values | Control System |
| Maintenance system | Health of field device/status | Health/Status= Good | Maintenance system |
| Maintenance system | Health of field device/status | Health/Status= Bad | Maintenance System and Control system |
| Maintenance system | Initialization | Initialization complete | Maintenance System and Control system |

CONNECTION EQUIPMENT AND A FIELD DEVICE CONTROL SYSTEM

TECHNICAL FIELD

The present invention relates to a connection equipment connected to a field device via a terminal port and to a control system, and, a field device control system for controlling a field device from a control system via a connection equipment.

BACKGROUND ART

In order to achieve an advanced automatic operation in a plant, etc., a field device control system, which comprises a field device (e.g. a measuring device, operation device), a control system for managing and controlling the field device (Control System), and the connection equipment (e.g. Junction Box) connected to the field device and the control system, have been configured conventionally.

In a process plant, field devices such as sensors and actuators measure or drive processes such as fluid process performed by plant equipment. Examples of sensors are flowmeter, temperature indicator, and example of actuators is valves.

Field devices are used in industries to control operation of a process. A field device, such as a transmitter, is located in the field to measure and transmit a process variable such as pressure, flow or temperature, for example, to control system located in the control room. A field device such as a valve controller controls position of a valve based upon a control signal received over the process control loop, or generated internally. Other types of controllers control electric motors or solenoids, for example. An operator or computer in the control room is capable of monitoring the process based upon process variables received from transmitters in the field and responsively controlling the process by sending signals to the appropriate field devices.

As hazardous substances, such as flammable gas may be handled in the plant, etc., an electric power source is normally not set in a field. It is set in a safe place such as the control room that is located far from the field and field devices.

Therefore, the connection equipment set in the field, etc., is configured to receive an electric power signal from a control room via a cable, and the field device set in the field, etc., is configured to receive the electric power signal via the connection equipment.

In a conventional field device control system, a control room houses a marshalling board and a control system. And the control room engineer or control room operator uses the marshaling board in the control room to marshal i.e. check and control a relationship of the field device set in the field and a terminal port of the connection equipment, to which the field device is connected.

Therefore when the terminal port, to which the field device is connected, is changed, or, when the new field device is connected to or disconnected from the terminal port in the connection equipment, the field engineer or field operator has to inform the control room engineer or control room operator. The control room engineer or control room operator has to then make changes to the connections in the marshaling board in the control room. For doing that, the control room engineer or control room operator has to refer to information contained in equipment layouts or segment design layouts.

In addition to the problem above, by setting the marshaling board in the control room, wiring cost increases and space available for the control room engineer or operator to work in the control room is reduced.

In order to solve these problems, a Fieldbus system has been used. A configuration example of the Fieldbus system is presented in FIG. 1.

The Fieldbus system in FIG. 1 comprises a field device 101, a connection equipment (JB: Junction Box) 100, a terminal board 103, an electric power supply unit PW 104, a control system 105, etc.

In the Fieldbus system in FIG. 1, the control system 105 performs the marshaling of field devices set in the field and terminal ports in the connection equipment. Specifically, software implemented in the control system 105 performs the marshaling, i.e. the task of checking and controlling a relationship of the field device 101 and a terminal port of JB 100 to which the field device 101 is connected. This allows a physical marshaling board to be omitted.

Due to software marshaling in the control system, the number of cables between the control system 105 and JB 100 can be reduced.

As illustrated in FIG. 1, in the Fieldbus system, it is possible to connect the terminal board 103 in the control room and JB 100 in the field with lesser number of cables 102 (e.g. 1 cable).

With lesser number of cables being used in the Fieldbus system, a communication signal from the control system 105 and an electric power signal from the electric power supply unit PW 104 are transmitted to JB 100 via a pair of wires in the same cable 102.

JB 100 transmits the received communication signal and the electric power signal received from the control system 105 to a terminal port assigned by the control system 105. The field device 101 receives the communication signal and the electric power signal via the terminal port to which the field device 101 is connected.

In this step, the communication signal and the electric power signal is transmitted from the control system 105 to the terminal port of the JB 100 to which the cable 102 is connected.

For example, when JB 100 transmits the communication signal and the electric power signal to the field device FT107 (101-3), JB 100 receives the communication signal and the electric power signal from the cable 102 connected to terminal port 1 and 2. Then, JB 100 transmits the communication signal and the electric power signal to the terminal port designated by the control system 105. In other words, JB 100 transmits the communication signal and the power signal to the terminal port 7, 8 and 9, to which the field device FT107 (101-3) connected. Thus the control system has to know the terminal port to which the required destination field device FT107 (101-3) is connected and accordingly, the JB 100 transmits the received communication signal and the electric power signal via the designated terminal port to the destination field device. The communication signal has to pass from terminal port 1 and 2, to the terminal port 7, 8 and 9, via the intermediate terminal ports in such configuration. Any fault in any of the terminal ports will cause the communication signal to be interrupted, which is undesirable. The control system uses physical address of the field device to address the field devices connected to the JB 100, and the JB 100 lacks any processing logic to avoid the communication signal and electric power signal from passing through multiple terminal ports without isolation.

PRIOR ART DOCUMENT

[Patent Document 1]
United States Patent: U.S. Pat. No. 8,374,094 B2 (Feb. 12, 2013)
[Patent Document 2]
United States Patent: U.S. Pat. No. 8,762,618 B2 (Jun. 24, 2014)
[Patent Document 3]
United States Patent: U.S. Pat. No. 8,379,546 (Feb. 19, 2013)
[Non-Patent Document 1]
Delta V Product Data Sheet S-Series Electric Marshalling, EMERSON Process Management (May, 2014)

SUMMARY OF THE INVENTION

There are advantages in the Fieldbus system above. As the control system 105 performs marshaling, the wiring cost is reduced. And as the physical marshaling board can be omitted, the space available for the control room engineer or operator for working in the control room is increased.

It should be noted that control room engineer can mean engineer, operator, or anybody in charge of the control system in this specification.

Similarly, it should be noted that field engineer can mean engineer, operator, or anybody in charge of the field devices in this specification.

However, there is a problem that an engineer or operator in the control room has to be in charge of the software which performs marshaling i.e. check and control the relationship between the field device 101 and the terminal port in JB 100. Since the field device 101 and the terminal port in JB 100 are in the field, while the control system is located in a control room far from the field device 101 and JB 100, the field engineer or field operator has to communicate with the control room engineer or control room operator. This is time consuming and more prone to error due to possible miscommunication.

In general, an engineer in the field is in charge of connecting, disconnecting the field device 101 to or from the terminal port in JB 100, replacing field device 101 and so on. The field engineer is responsible for configuring the field device. It is preferable that the engineer in the control room executes the operations related to the field device 101 such as collecting measurements from the field device 101, after the field device 101 is connected to JB 100, instead of having to perform or verify the marshaling. Therefore it is not preferable to marshal the terminal port, to which the field device 101 connected, in the control system 105, but rather, it is preferable to marshal i.e. control and check relationship between the field device 101 and the terminal port in JB 100 in the field itself, without manual intervention.

Further, as the function of the marshaling board is integrated in to software of a specific control system 105, there is a problem that when the control system 105 is modified (for e.g. when the control system is changed to a new control system from a different vendor, when the control system is upgraded to a newer version etc.), the software performing the marshaling also has to be modified. Any change in control system will require change in the software which causes marshaling to be suspended temporarily. During this time, any action by the field engineer or operator in the field i.e. connection, disconnection, replacement etc. of field device 101 to the JB 100 will not be updated to the control system. At times, the field engineer or operator may not be immediately informed of the failure of control system or the software in the control system, and all the actions performed by the field engineer or operator, such as connection, disconnection, replacement etc. of field device 101 during the control system or software downtime would need to be performed again, once the control system and/or the software is functional.

Further, the number of cables can be reduced in the Fieldbus system above, but the communication signal and the electric power signal are transmitted to the terminal port to which the field device is connected, via the terminal ports to which the cable is connected. This means that if any problem happens to the terminal ports to which the cable is connected, or other terminal ports in the JB 100, the communication signal and the electric power signal will not reach the terminal port to which the field device is connected.

Further, due to this configuration, when an electrical short circuit occurs between the field device 101 and the terminal port, the influence of the electrical short circuit may affect JB 100, all the field devices 101 connected to JB 100, and the control system 105.

The present invention is invented considering the problems above. The purpose of this invention is to provide the connection equipment and the field device control system, which can reduce the overall field device control system cost, can omit the marshaling board, does not require the engineer in the control room or in the field to check, perform, or be in charge of marshaling of the terminal port and the field device, can increase the space available for the control room engineer or operator in the control room, and can limit the influence of electrical short circuit to a certain scope.

In order to solve the problems above, a first embodiment of this invention is summarized as, a connection equipment connected to a field device via one of a plurality of terminal ports, the field device controlled by a control system connected to the connection equipment, the connection equipment comprising, a transmitter/receiver, a processor configured to receive a communication signal from the control system via the transmitter/receiver, to determine the terminal port from among the plurality of terminal ports based on a field device reference included in the received communication signal, and to instruct the transmitter/receiver to transmit the received communication signal to the field device via the determined terminal port, and an isolator configured to electrically isolate the communication signal to be transmitted to the field device via the determined terminal port and an electric power signal to be provided to the field device via the determined terminal port, from rest of the plurality of terminal ports.

According to this embodiment, the communication signal from the control system is transmitted along the transmitter/receiver and the processor of the connection equipment independent of the electric power signal from the control system, so even if an electric short circuit in any one terminal port of the connection equipment or field device occurs, the communication signal remains unaffected, and subsequently the processor and transmitter/receiver are also unaffected. In such configuration, the communication signal does not have to go to any terminal port other than the terminal port to which the required field device is connected.

And a second embodiment of this invention is summarized as, a field device control system for controlling a field device from a control system via a connection equipment, connected by a cable, and providing an electric power signal to the connection equipment. The control system comprises a processor configured to generate a communication signal including a field device reference and a transmitter/receiver configured to transmit the communication signal. The connection equipment comprises a memory configured to store a table for associating the field device reference of the field device with an identification of the terminal port, a processor configured to determine the terminal port corresponding to the field device reference included in the communication signal received from the control system, based on the table and to instruct the transmitter/receiver to transmit the communication signal to the terminal port determined, the transmitter/receiver configured to transmit the received communication signal received from the processor to the field device via the determined terminal port based on the instruction by the processor, an electric power adjustor configured to adjust a level of an electric power signal to be provided to the field device via the terminal port based on an input level of an electric power signal received via the cable, and an isolator configured to electrically isolate the communication signal to be transmitted to the field device via the terminal port and the electric power signal to be provided to the field device at the terminal port, from the other terminal ports.

The field device control system according to the second embodiment may further comprise a security control unit which is placed between the connection equipment and the control system, and which is connected to the connection equipment and the control system via the cable.

A third embodiment of this invention is summarized as, a processor in a connection equipment which is connected to a control system via a cable and a field device via a terminal port, comprises an address resolution module configured to resolve a relationship of a field device reference of the field device and an identification of the terminal port to which the field device is connected, by referring to a table stored in a memory of the connection equipment, a destination determination module configured to determine the terminal port to which a communication signal from the control system is to be transmitted, in response to communication with the address resolution module, based on the field device reference included in the communication signal, and a protocol conversion module configured to convert a protocol applied to the communication signal between the control system and the connection equipment to a protocol applied to the communication signal between the connection equipment and the field device.

BRIEF DESCRIPTION OF THE DRAWINGS

FIG. 4 is a diagram illustrating a table stored by a connection equipment according to the first embodiment.

FIG. 11 is a diagram illustrating a table stored in a connection equipment according to the second embodiment.

MODES FOR CARRYING OUT THE INVENTION

First Embodiment

A connection equipment (IJB: Isolated Junction Box) 200 and a field device control system according to the first embodiment of this invention is explained referring to the figures.

(Overall Configuration of the Field Device Control System)

Figure 1:
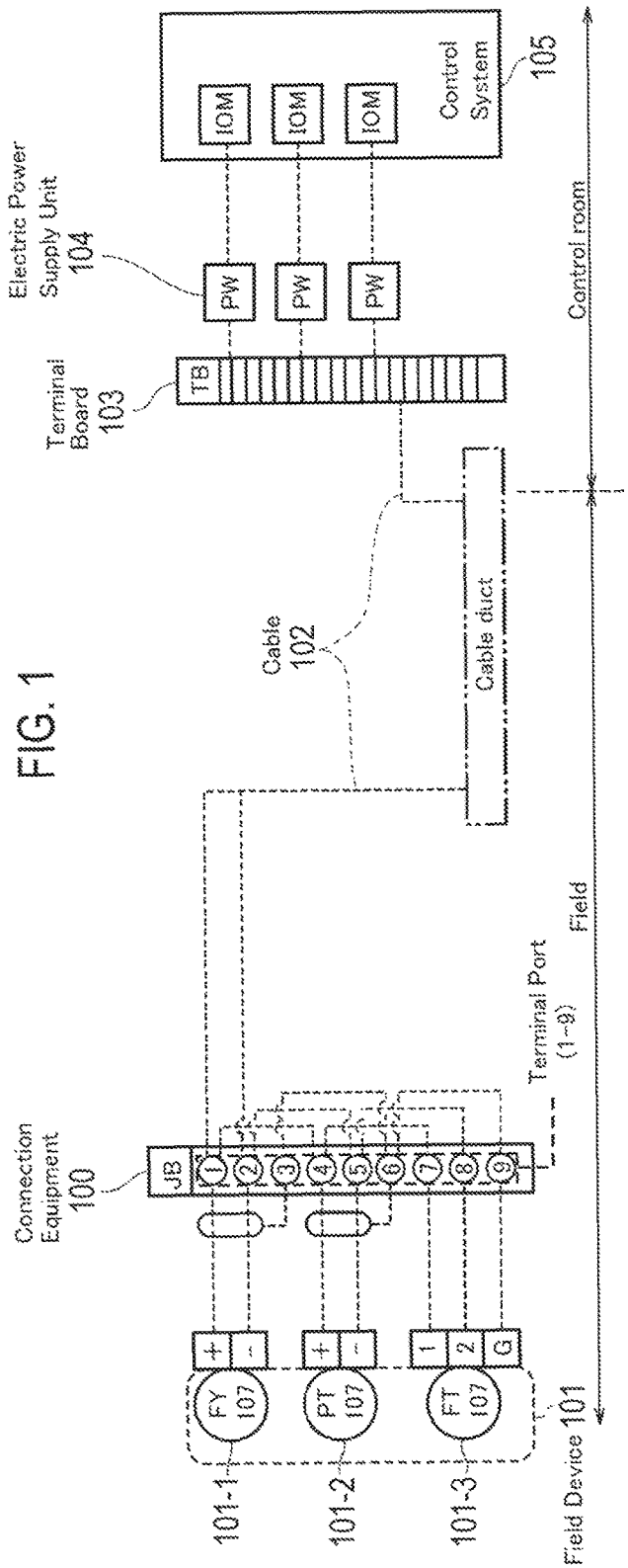
FIG. 1 is a diagram illustrating a conventional field device control system.
Figure 2:
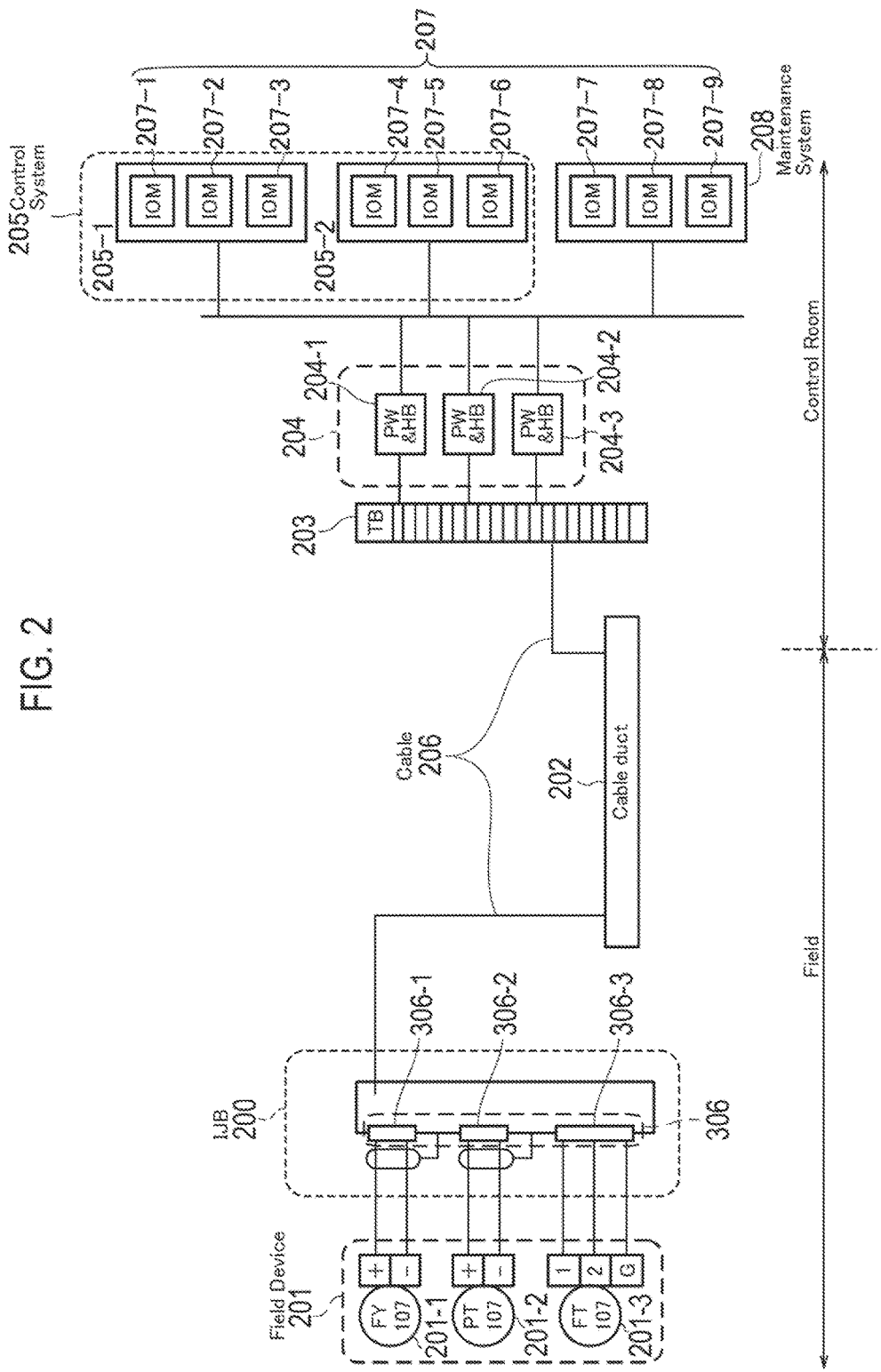
FIG. 2 is a diagram illustrating an overall configuration of a field device control system according to the first embodiment.

The field device control system according to this embodiment is shown in FIG. 2. As it is shown in FIG. 2, the field device control system according to this embodiment comprises one or more field devices 201, IJB 200, a cable duct 202, a terminal board (TB) 203, Power and Hub unit (PW&HB unit) 204, control systems (205), a maintenance system 208 and one or more input and output modules (IOM) 207.

In the field device control system according to this embodiment, the control system 205 is configured to control the one or more field devices 201 via IJB 200, which is connected to the control system 205 by a cable 206, and to provide IJB 200 with an electric power signal via the cable 206.

The one or more field devices 201 are set for taking measurements and for executing operations in a field such as an industrial plant. The field device 201 is connected to IJB 200 via one of the terminal ports 306.

IJB 200 is connected to the control systems 205 and the maintenance system 208 via the cable 206 and to the field device 201 via the terminal port 306. It should be noted that two control systems 205 and one maintenance system 208 are described in FIG. 2 but the number of the control systems 205 and the maintenance system 208 is not limited to the number in FIG. 2. The minimum configuration of the field device control system, is one control system 205.

And IJB 200 is configured to transmit and receive the communication signal to/from the control system 205 and the field device 201, and to receive an electric power signal via the cable 206 and to provide the field device 201 with the electric power.

As IJB 200 is set in the field, IJB 200 is made water-proof, dust proof and intrinsically safe.

IJB 200 is configured to transmit the communication signal to the field device 201 via the terminal port 306 and to transmit the electric power signal to the field device 201 via the terminal port 306.

IJB 200 can communicate with the control system 205 with the existing Fieldbus protocol, or other standard protocol such as Ethernet-IP, Profibus-DP protocols. The detailed operation of IJB 200 is described later.

The cable duct 202 protects the cable 206, connecting the control system 205 which is set in the control room, and IJB 200, which is set in the field.

The control system 205 is configured to transmit the communication signal for operating the field device 201 and to receive the communication signal from the field device 201.

The control system 205 is configured to set a configuration of the field device 201. In the control system 205, the input and output module (IOM) 207 is set for an engineer in the control room to operate the field device 201.

The maintenance system 208 is configured to maintain the field device 201. In the maintenance system 208, the input and output module (IOM) 207 is set for an engineer in the control room to maintain the field device 201.

A field device reference, which is used by the control system 205 for identifying the field device 201, is a logical name of the field device 201. The logical name is set by an engineer who manages the field device 201 (User Defined Name). The field device reference is also called "Application Name".

Power and Hub unit (PW & HB unit) 204 generates the electric power signal for providing IJB 200 and the field device 201 with the electric power. There are cases where flammable gas and other hazardous elements are used in the field in which IJB 200 and the field device 201 are set. Therefore it is dangerous to set the electric power providing equipment in the field.

Due to the reason above, PW & HW unit 204 is preferably set in the safe control room, and provides IJB 200 and the field device 201 with the electric power required for proper functioning of the IJB 200 and the field device 201.

However, the location of the power source can be changed depending of factors such as the type of plant, operational requirements and so on. The electric power signal generated by PW & HB unit 204, is transmitted to IJB 200 via the terminal board 203 and the cable 206. It should be noted that the electric power signal, which is transmitted to IJB 200 and the field device 201, is combined with the communication signal along a pair of wires in the same cable and is transmitted to IJB 200.

PW & HB unit 204 transmits and receives the communication signal and the electric power signal at a transmission rate suitable for a communication between IJB 200 and PW & HB unit 204. And PW & HB unit 204 transmits and receives the communication signal at a transmission rate suitable for a communication between the control system 205 and PW & HB 204. That is, PW & HB unit 204 has a transmission rate adjustment function.

Hub function in PW & HB unit 204 distributes the communication signal to the appropriate destinations (e.g. IJB 200, control system 205, maintenance system 208 etc.).

It should be noted that a place for setting IJB 200 is decided at the time of the engineering of the field device control system. Therefore the cable 206 for connecting the terminal board 203 and IJB 200 is usually a standard factory-made cable (e.g. standard instrumentation cables).

On the other hand, a length of a cable for connecting IJB 200 and the field device 201 is not fixed, as a required length of the cable depends on the place of the field device 201 set in the field. However, short connector cables can be applied between IJB 200 and the field device 201, as a distance between IJB 200 and the field device 201 is usually short. The use of standard and easily available cables reduces the overall wiring cost compared to the cost upon using customized or specialized cables.

(Configuration of the Connection Equipment IJB 200)

Figure 3:
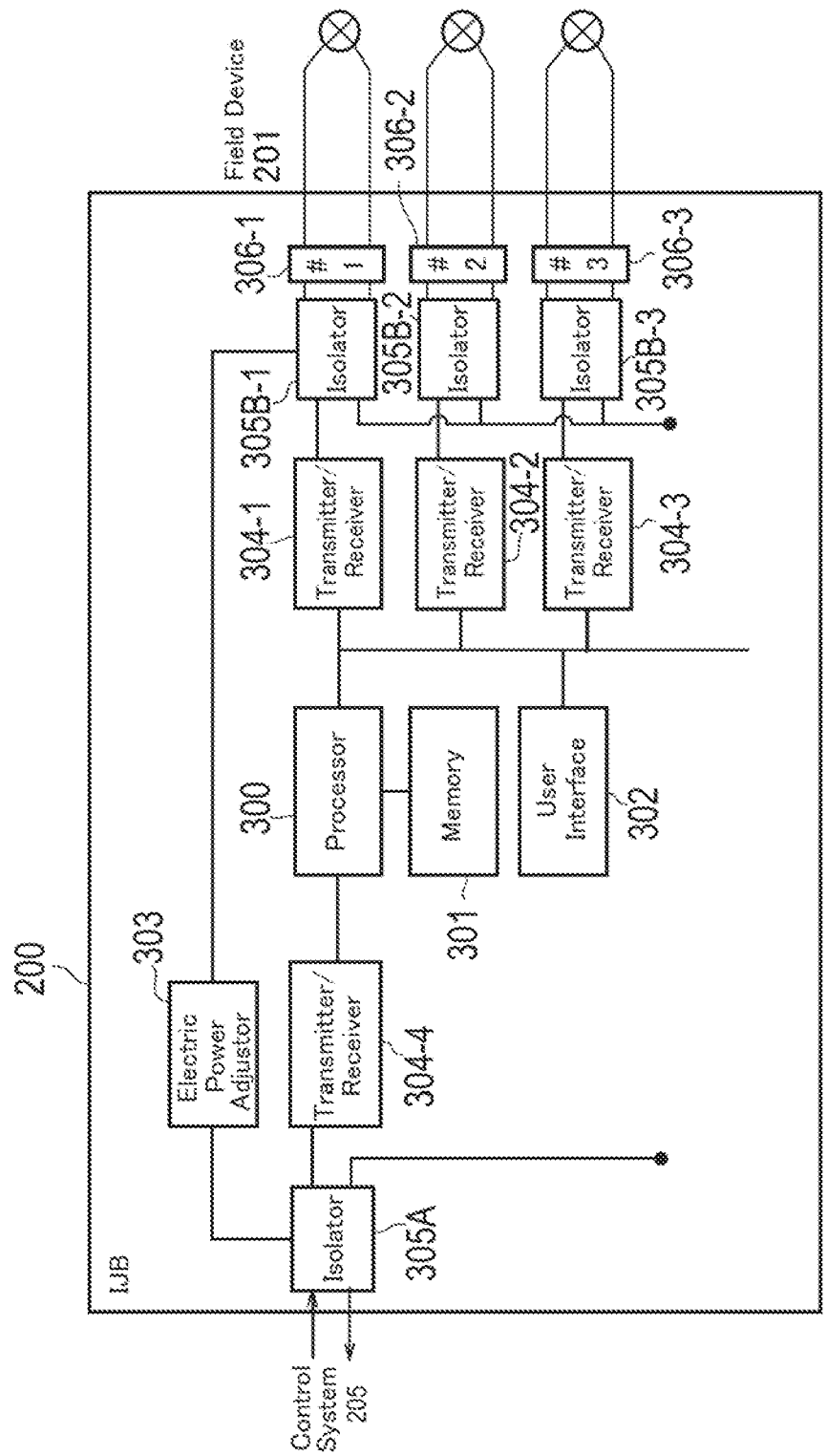
FIG. 3 is a block diagram illustrating a connection equipment according to the first embodiment.
Figure 5:
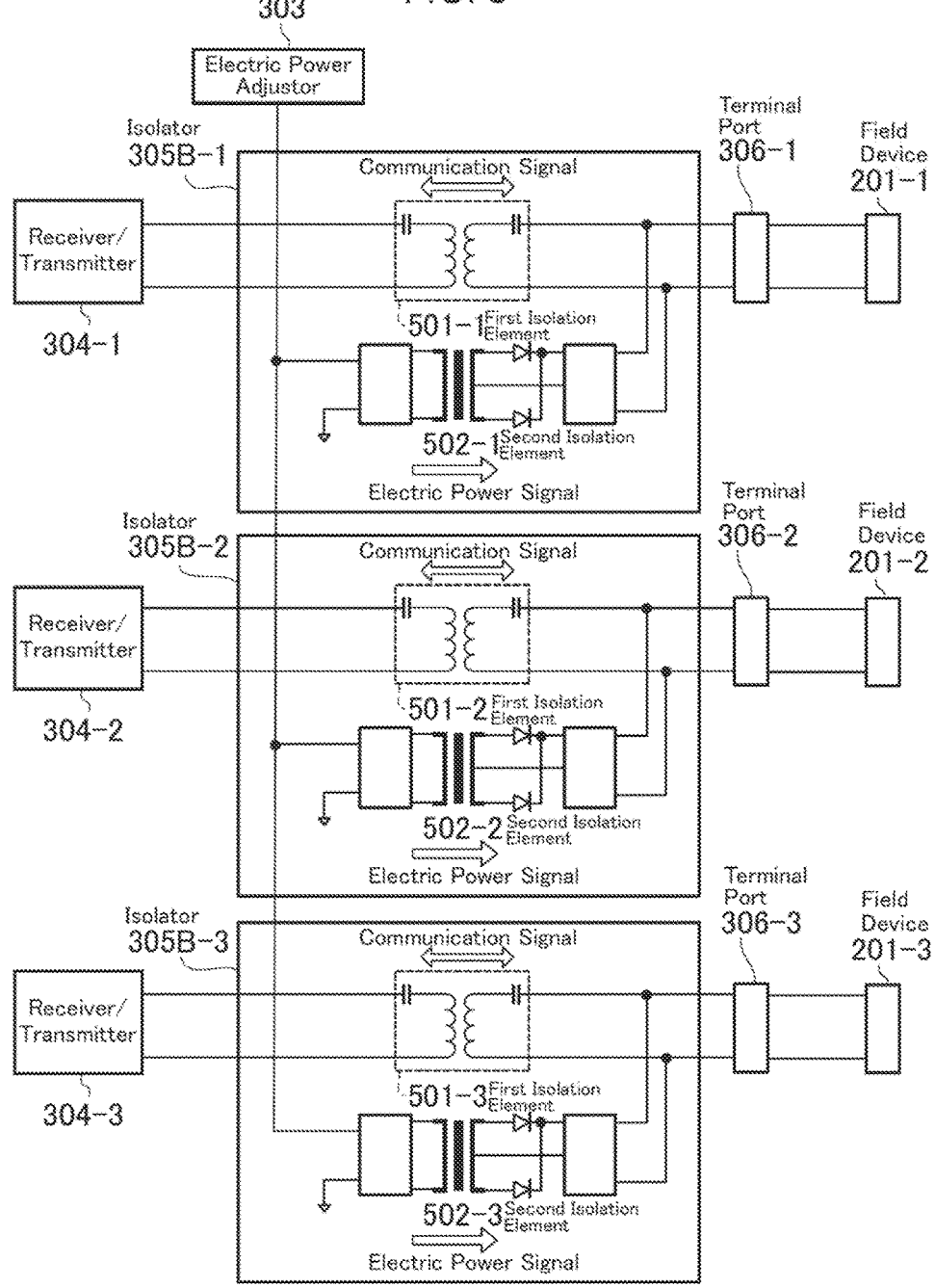
FIG. 5 is a diagram illustrating a structure of an isolator according to the first embodiment.

A configuration of IJB 200 according to this embodiment is explained, referring to FIG. 3 to FIG. 5.

As it is shown in FIG. 3, IJB 200 comprises a processor 300, a memory 301, an user interface 302, an electric power adjustor 303 and a transmitter/receiver 304-1 . . . 304-4, an isolator 305A, an isolator 305B-1 . . . 305B-3, and a terminal port 306-1 . . . 306-3.

The number of the transmitter/receiver 304, the isolator 305B, and the terminal port 306 is showing one of the configuration examples and are changeable.

The memory 301 is configured to store a table for associating a field device reference of the field device 201 with an identification of the terminal port 306.

And the table in the memory 301 may be configured to include a unique field device reference, which is uniquely allocated to the field device 201, in addition to the field device reference.

The field device reference is field device name or field device tag for identifying the field device 201 by the engineer managing the control system 205, and may be same as that of another field device 201 in some cases. In such a case, the unique field device reference is used to identify the field device 201 specifically. The unique field device reference is a fixed value (e.g. field device ID or field device serial number) and uniquely allocated to the field device 201 before a shipment of the field device 201 by the field device manufacturer. Thus no two field devices 201 will have the same unique field device reference. One of the advantages of this invention is that the control system can refer to the field device using the field device reference.

A specific example of the table stored by the memory 301 is explained referring to FIG. 4.

The table, shown in FIG. 4, is configured to manage a relationship of the terminal port identification, a field device type, the field device reference and the unique field device reference.

In the example in FIG. 4, the table is shown, when the field devices 201 are connected to the terminal port 306-1/3/6/8. The field device type is showing the type of the field device 201, such as a flow meter, a temperature sensor, a pressure control valve, and a flow control valve. The field device type specifies if the field device is Analog Input (AI) device, or analog output (AO) device.

The processor 300 is configured to determine the terminal port 306-1/306-2/306-3, corresponding to the field device reference included in a communication signal received from the control system 205 based on the table, and to instruct the transmitter/receiver 304 to transmit the communication signal to the terminal port 306 determined.

Specifically, firstly, the processor 300 retrieves the field device reference from the communication signal received from the control system 205.

Secondly, the processor 300 obtains the terminal port identification corresponding to the field device reference included in the communication signal, from the table stored in the memory 301.

Thirdly, the processor 300 instructs the transmitter/receiver 304 to transmit the communication signal to the determined terminal port 306 in response to the terminal port identification obtained from the memory 301.

The processor 300 may be configured to determine a transmission destination of the communication signal received from the field device 201 via the terminal port 306, based on the terminal port 306.

The processor 300 may be configured to determine a transmission destination of the communication signal received from the field device 201 via the terminal port 306, based on the type of request from the control system 205 and the event/message generated by the field device 201.

The communication signal is transmitted to the control system 205-1, the control system 205-2, or the maintenance system 208 based on the transmission destination determination made by the processor 300.

The processor 300 may be configured to detect an establishment of a connection of the field device 201 to the terminal port 306 and an occurrence of a disconnection of the field device 201 from the terminal port 306.

At this point, the processor 300 may be configured to detect the establishment of the connection of the field device 201 to the terminal port 306 and the occurrence of the disconnection of the field device 201 from the terminal port 306, when a level of at least one of electric current, electric voltage or electric power at the terminal port 306 is changed.

The processor 300 may be configured to notify the establishment of the connection of the field device 201 to the terminal port 306 and the occurrence of the disconnection of the field device 201 from the terminal port 306 to the memory 301.

And the memory 301 may be configured to receive a notification regarding the establishment of the connection of the field device 201 to the terminal port 306 and the occurrence of the disconnection of the field device 201 from the terminal port 306, from the processor 300, based on which the table stored in the memory is updated by the processor 300. It means that the processor 300 updates the table stored in the memory 301 based on the establishment of the connection of the field device 201 to the terminal port 306 and the occurrence of the disconnection of the field device 201 from the terminal port 306.

The memory 301 may be configured to store a history regarding the establishment of the connection of the field device 201 to the terminal port 306 and the occurrence of the disconnection of the field device 201 from the terminal port 306. The processor 300 may be configured to report the history stored by the memory 301 to the control system 205, periodically or on demand by a user such as control room engineer, field engineer etc.

The processor 300 may be configured to communicate with the control system 205 at a first communication speed, and to communicate with the field device 201 at the second communication speed which is different from the first communication speed.

In a typical case, the communication signal can usually be transmitted and received between the control system 205/PW&HB unit 204 and IJB 200 with a high data rate. However the communication speed applied between IJB 200 and the field device 201 depends on a performance of the field device 201 (for e.g. different communication speeds of HART device, FF device, Profibus device etc.). Therefore, the communication speed applied between IJB 200 and the field device 201 is usually slower than that applied between the control system 205/PW&HB unit 204 and IJB 200. The communication speed applied between IJB 200 and the field device 201 may also be equal to the communication speed between the control system 205/PW&HB unit 204 and IJB 200.

The processor 300 may execute a protocol conversion on the communication signal received from the control system 205. Protocol conversion implies changing a signal format of the communication signal to a recognizable signal format for the field device 201. The processor may be configured to retrieve the signal format required by the field device 201 when the field device 201 is connected to the IJB 200 via a terminal port 306.

The transmitter/receiver 304 is configured to transmit the communication signal received from the processor 300 to the field device 201 via the determined terminal port 306 based on the instruction by the processor 300.

Specifically, the transmitter/receiver 304 receives the communication signal via the isolator 305A, and transmits the communication signal to the field device 201 via the terminal port 306 decided by the processor 300.

The electric power adjustor 303 is configured to adjust a level of an electric power signal to be provided to the field device 201 via the terminal 306 port, based on an input level of an electric power signal received via the cable 206.

The electric power adjustor 303 may be configured to increase or match a power level of the received electric power signal from an input level of an electric power signal received via the cable to a predetermined power level, which is required for proper functioning of the field device 201 and IJB 200.

The required electric power for IJB 200 and the field devices 201 are described in an exemplary formula as follows.

$$P2=(P3.1+P3.2+\ldots+P3.n+IJB200 \text{ electric power})$$

P2 is a total electric power to be output from the electric power adjustor 303. "P3.1 to p3.$n$" represents the required electric power for each of the n field device 201, n being the number of field device 201 connected to the IJB 200. IJB 200 electric power represents the power required by the components within the IJB 200. Thus the electric power adjustor 303 ensures the power level of the electric power signal received from the control system 205 via the cable is increased to the level of P2.

If the total electric power P2 exceeds a maximum limit, the IJB 200 will automatically detect exceeding power and cut-off the field device 201 requiring more power.

As the electric power signal is transmitted from PW&HB unit 204 set in the control room to IJB 200 set in the field via the cable 206, the electric power signal may be attenuated. Therefore the electric power adjustor 303 amplifies a power level of the received electric power signal to a power level required for the operation of the field device 201 and IJB 200.

The isolator 305B is configured to electrically isolate the communication signal to be transmitted to the field device 201 via the terminal port 306 and the electric power signal to be provided to the field device 201 via the terminal port 306, from the other terminal ports 306.

The isolator 305B receives the electric power signal from the electric power adjustor 303, and passes it to the terminal port 306. The isolator 305B receives the communication signal from the transmitter/receiver 304 and transmits it to the terminal port 306. And the isolator 305B receives the communication signal from the field device 201, and passes it to the transmitter/receiver 304. Thus the communication signal can pass bilaterally (two-way) between the IJB 200 and the field device 201 through the isolator while the power signal is sent unilaterally (one-way) from the IJB 200 to the field device 201 through the isolator.

The isolator 305B electrically isolates the communication signal and the electric power signal from the other terminal ports 306, when the isolator 305B passes the communication signal and the electric power signal via the terminal port 306.

A configuration of the isolator 305B is explained referring FIG. 5. As shown in FIG. 5, each isolator 305B has a first isolation element 501, such as a transformer and a second isolation element 502, such as a transformer, a diode.

It should be noted that, although the transformer is described as the first isolation element 501 and the second isolation element 502, any other electric element that has the same character can be applied as the first isolation element and the second isolation element.

The communication signal can be passed bilaterally between the transmitter/receiver 304 and the field device 201.

Specifically, the communication signal can be passed bilaterally between the transmitter/receiver 304 and the field device 201 via the first isolation element 501 set in the isolator 305B.

On the other hand, the electric power signal can be passed unilaterally to the field device 201 via the terminal port 306 via the second isolation element 502. Specifically, the electric power signal can be passed only to the field device 201 connected to the terminal port 306 via the second isolation element 502 set in the isolator 305B.

The specific operation of the isolator 305B is explained below. The case when the communication signal is transmitted/received between IJB 200 and the field device 201-1 is explained as an example.

The communication signal from the transmitter/receiver 304-1 is transmitted to the field device 201-1 via the first isolation element 501-1 set in the isolator 305B-1 and the terminal port 306-1.

The electric power signal from the electric power adjustor 303 is sent to the field device 201-1 via the second isolation element 502-1 set in the isolator 305B-1 and the terminal port 306-1. The electric component, which passes the electric power signal unilateral, such as a transformer or a diode may be applied as the first and second isolation element.

The communication signal from the field device 201-1 is transmitted to the transmitter/receiver 304-1 via the terminal port 306-1 and the first isolation element 501-1.

Due to the configuration of the isolator 305B-1, when an electric short circuit occurs in the field device 201-1 or the terminal port 306-1, the influence of the electric short circuit to the inside of IJB 200 (e.g. the terminal port 306) can be avoided.

The isolator 305A may be configured to electrically isolate the cable 206 and the terminal port 306.

The isolator 305A receives the communication signal from the control system 205 and the electric power signal from PW&HB unit 204. The isolator 305A separates the communication signal and the electric power signal. Specifically the isolator 305A separates the paths of the communication signal and the electric power signal. The isolator 305A passes the electric power signal to the electric power adjustor 303 and the communication signal to the transmitter/receiver 304.

The user interface 302 is a user interface for an engineer in charge of IJB 200 (field engineer or field operator) to operate IJB 200. The engineer in charge of IJB 200 can configure the field device 201 using the user interface 302. The user interface 302 comprises a switch, Light emitting diode (LED), LED screens, LCD and so on. And the operation of the user interface 302 can be executed remotely using wireless communication. The IJB 200 may further include a mode of input such as keyboard, keypad, touchscreen, stylus, etc.

The terminal port 306 forwards the communication signal and the electric power signal, passing through the isolator 305B, to the field device 201. The terminal port 306 receives the communication signal from the field device 201, and forwards the communication signal to the transmitter/receiver 304.

The number of the terminal port 306 in IJB is assumed to be around 8. IJB 200 can implement any number of the terminal port 306. The number of the terminal port 306 is decided considering cost, size of IJB 200, the electric power and the electric current provided to IJB 200, and so on.

It is preferable that IJB 200 can communicate with a maintenance terminal using widely applied interfaces, such as USB in the field. When the maintenance terminal can communicate with IJB 200 directly in the field, the control system 205 and/or the maintenance system does not need to execute the maintenance remotely.

The control system 205 identifies and controls the field device 201 by the field device reference which is set by the engineer in charge of the control system 205. Therefore, when one of the field devices 201 is replaced with another field device 201 having the same field device reference, the control system 205 does not have to be informed of the replacement by the field engineer. The only required procedure during such field device replacement is updating the table in the memory 301 of IJB 200 by the processor 300 in the IJB 200. So the configuration of the control system 205 does not need to be changed, when the field device 201 is replaced due to a failure or for any other reason.

(Operating Sequence)

Figure 6:
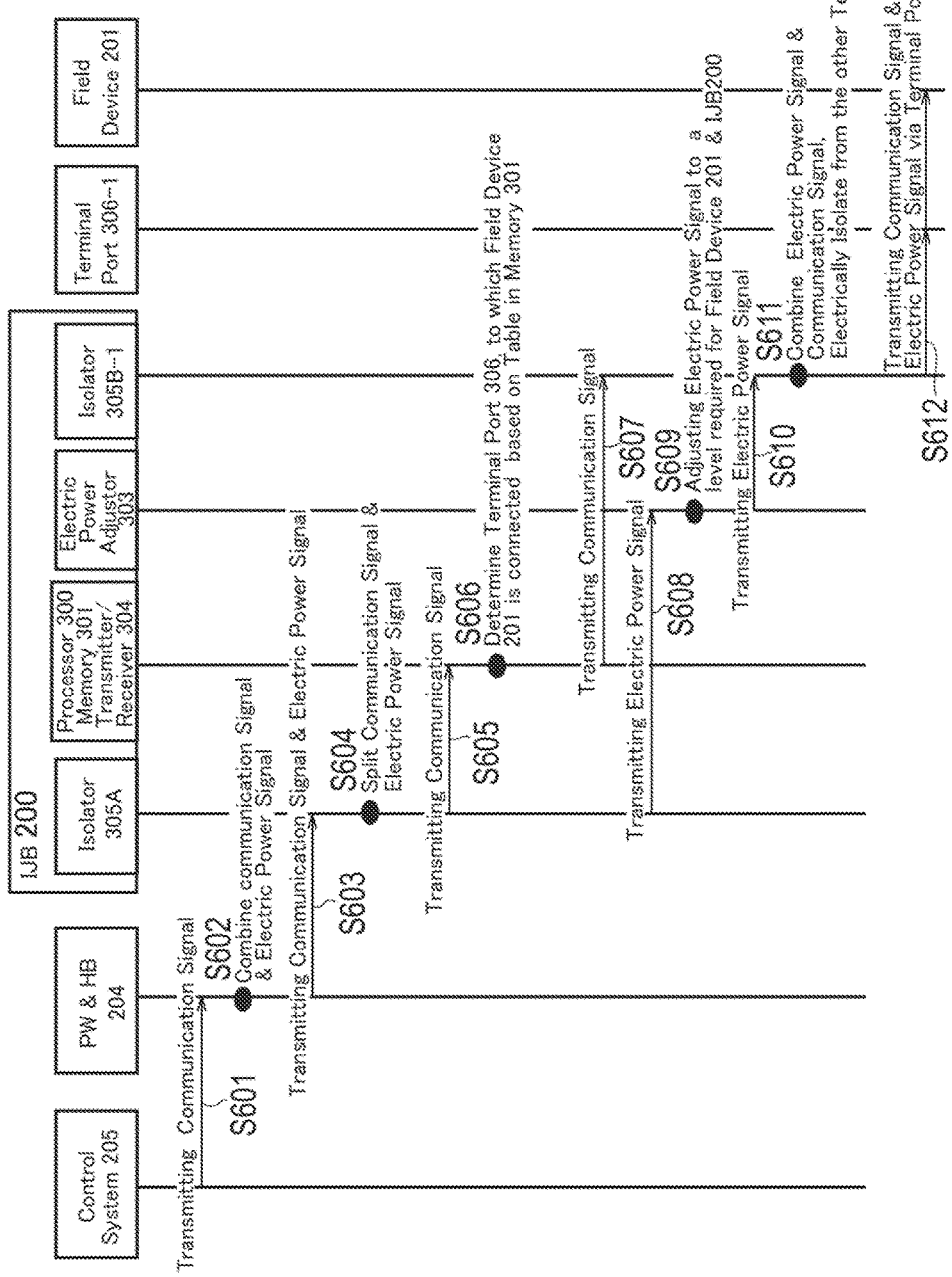
FIG. 6 is a sequence diagram according to the first embodiment.
Figure 7:
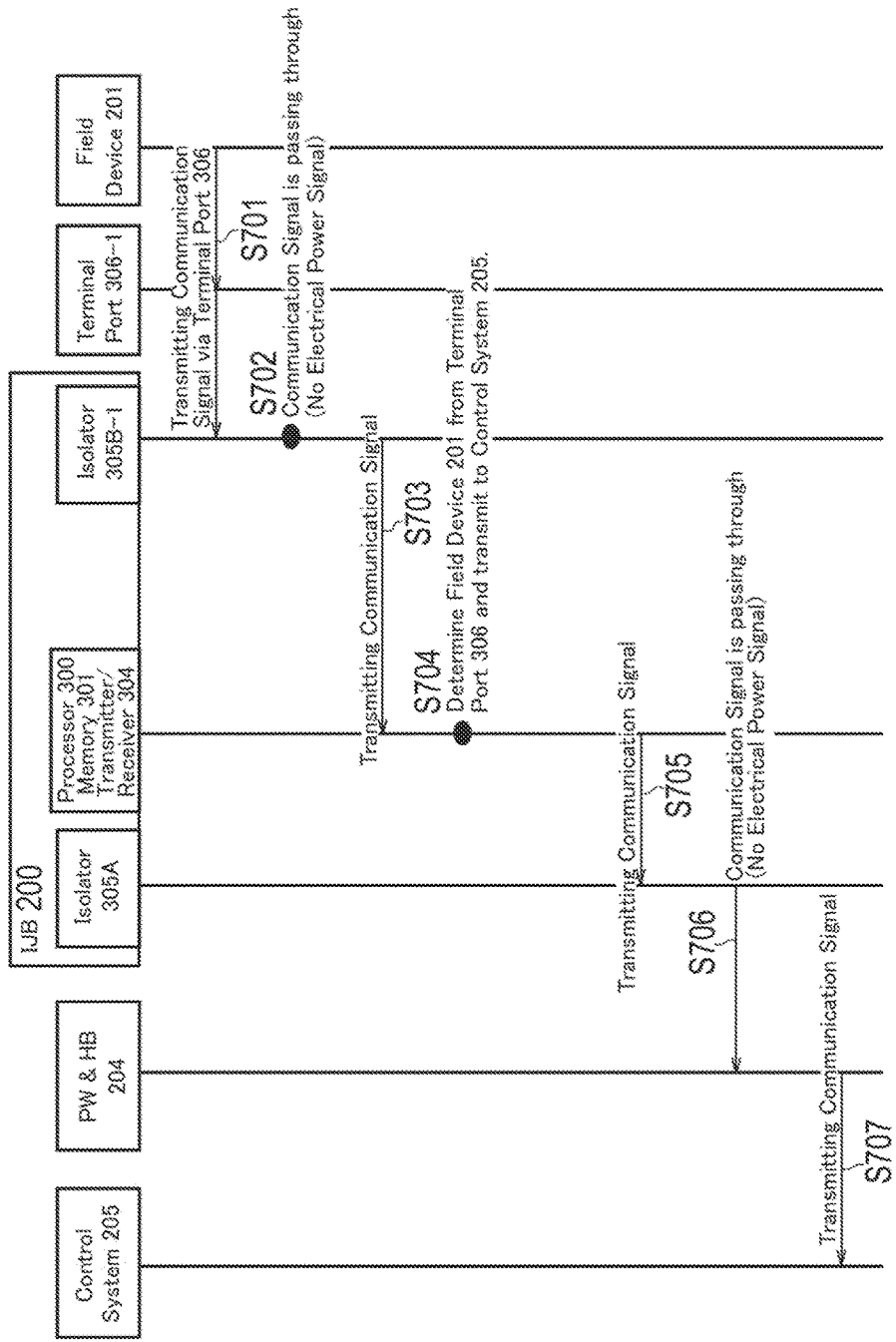
FIG. 7 is a sequence diagram according to the first embodiment.

The operating sequence of the field device control system according to the first embodiment is explained referring to FIG. 6 and FIG. 7. In this example, the control system 205 is communicating with the field device 201 connected to terminal port 306-1.

Firstly, an example of the operational sequence, when the control system 205 transmits the communication signal to the field device 201, is explained, referring to FIG. 6.

As shown in FIG. 6, in step 601, the control system 205 transmits the communication signal to PW&HB unit 204. The communication signal includes the field device reference of the field device 201-1.

In step 602, the PW&HB unit 204 combines the communication signal received from the control system 205 with the electric power signal generated in PW&HB unit 204. By combining, it means that the communication signal and electric power signal are sent along a pair of wires in the same path, for e.g. twisted pair, from the PW&HB unit 204.

In step 603, PW&HB unit 204 sends the combined signals to isolator 305A in IJB 200.

In step 604, the isolator 305A separates the communication signal and the electric power signal, when the isolator 305A receives the communication signal and the electric power signal. By separation, it means that the communication signal and the electric power signal will not be passed together from the isolator 305A along a pair of wires, but that the path of the communication signal and the electric power signal will be separated at the isolator 305A.

In step 605, the isolator 305A passes the communication signal to the transmitter/receiver 304-4.

In step 606, the transmitter/receiver 304-4 transmits the communication signal to the processor 300. The processor 300 determines the destination terminal port 306-1 of the communication signal received by referring to the table stored in the memory 301, and decides the destination terminal port 306-1 based on the field device reference included in the communication signal. The processor 300 instructs the transmitter/receiver 304-1 to transmit the communication signal to the determined destination terminal port 306-1.

In step 607, the transmitter/receiver 304-1 transmits the communication signal to the isolator 305B-1.

In step 608, the isolator 305A passes the electric power signal to the electric power adjustor 303, in parallel with step 605.

In step 609, the electric power adjustor 303 increases an electric power level of the electric power signal to an electric power level required for operating the field device 201 and IJB 200.

In step 610, the electric power adjustor 303 sends the electric power signal to the isolator 305B-1.

In step 611, the isolator 305B-1 combines the communication signal and the electric power signal to be forwarded to the terminal port 306-1, and electrically isolates the communication signal and the electric power signal from the other terminal port 306-2 and 306-3. By combining, it means that the isolator 305B-1 ensures that the path of the communication signal and the electric power signal are combined in the isolator 305B-1.

In step 612, the communication signal and the electric power signal are passed to the field device 201-1 via the isolator 305B-1 and the terminal port 306-1.

Secondly, an example of the operational sequence, when the field device 201 transmits the communication signal to the control system 205, is explained, referring to FIG. 7. In this example, field device 201-1 is communicating to the control system 205.

In step 701, the field device 201-1 transmits the communication signal to the isolator 305B-1 via the terminal port 306-1.

In step 702, the isolator 305B-1 receives the communication signal. When an electrical short circuit occurs in the field device 201-1, in the terminal port 306-1 or in the isolator 305B-1, any negative impact of the electrical short circuit to IJB 200 and other field devices 201 can be avoided.

In step 703, the isolator 305B-1 passes the communication signal to the transmitter/receiver 304.

In step 704, the transmitter/receiver 304 transmits the communication signal to the processor 300. The processor 300 decides the control system 205 based on the terminal port 306-1 from which the communication signal is received and passes the communication signal to transmitter/receiver 304.

In step 705, the transmitter/receiver 304 transmits the communication signal to the isolator 305A.

In step 706, the isolator 305A passes the communication signal to PW&HB unit 204. When an electrical short circuit occurs in IJB 200, an influence of the electrical short circuit to the control system 205 and PW&HB unit 204 can be avoided. Then, PW&HB unit 204 sends the communication signal to the control system 205. In step 707, the control system 205 receives the communication signal from PW&HB unit 204.

(Operation when the Connection of IJB 200 and the Field Device 201 is Established)

Figure 8:
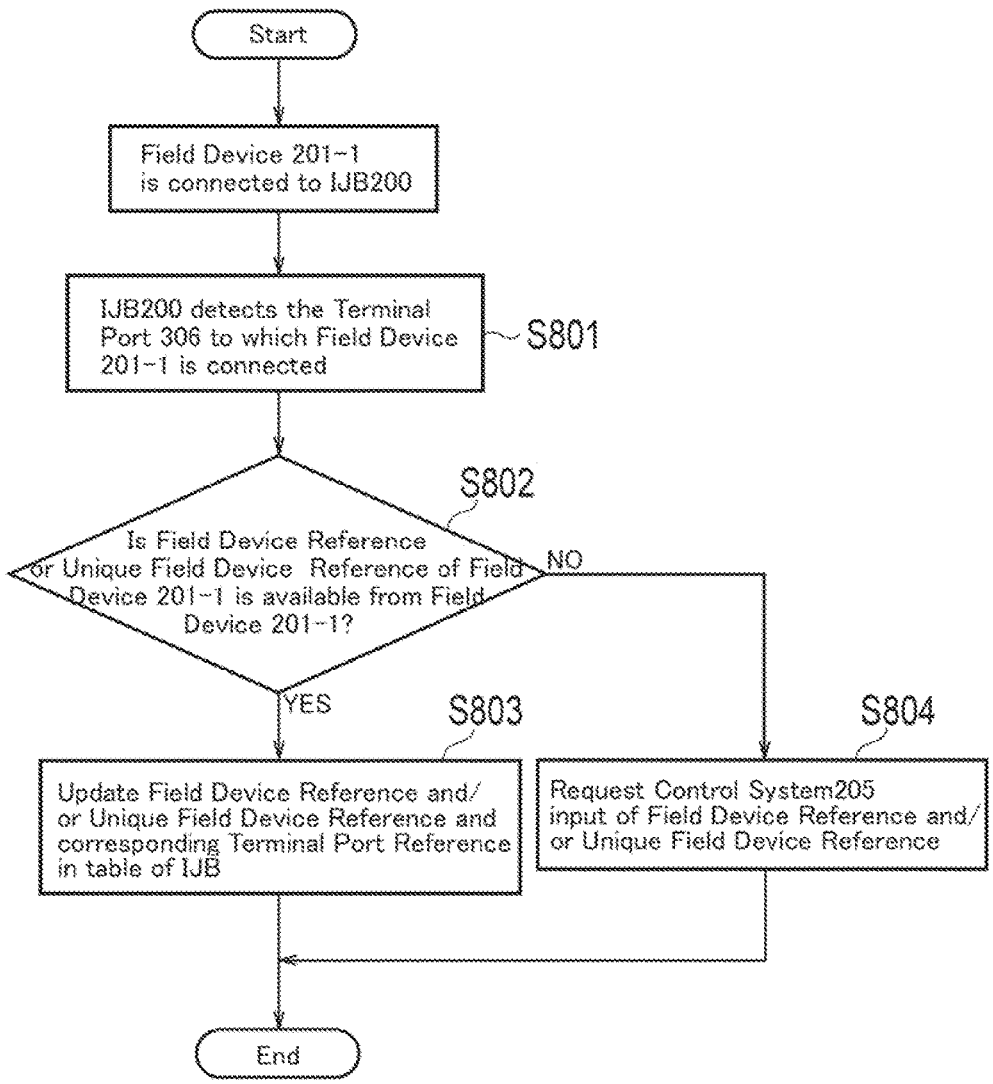
FIG. 8 is a flow chart according to the first embodiment.

An operation, when the connection of IJB 200 and the field device 201 is established, is explained referring FIG. 8.

In step 801, when the field device 201-1 is connected to IJB 200, IJB 200 identifies the terminal port 306, to which the field device 201-1 is connected.

In step 802, IJB 200 tries to obtain at least one or both of the field device reference of the field device 201-1 and the unique field device reference of the field device 201-1.

When IJB 200 can obtain at least one of the field device reference and the unique field device reference from the field device 201-1 (In Step 802, "YES"), IJB 200 updates the field device reference and/or the unique field device reference corresponding to the terminal port 306 in the table stored in the memory 301, in step 803.

On the other hand, when IJB 200 cannot obtain both the field device reference and the unique field device reference (In Step 802, "NO"), IJB 200 requests the control system 205 to input the field device reference of the field device 201-1 and/or the unique field device reference of the field device 201-1. Alternatively, the field engineer inputs the field device reference of the field device via the input mode of the IJB 200.

It should be noted that IJB 200 deletes the field device reference of the field device 201-1 and the unique field device reference of the field device 201-1 managed by the table, when IJB 200 detects an occurrence of a disconnection.

(Technical Effect)

In IJB 200, according to this embodiment, the processor 300 decides the destination terminal port 306 of the communication signal. This point is different from the conventional Fieldbus system. The communication signal is directly transmitted to the terminal port 306 determined, without going through other terminal ports 306. The electric power signal and the communication signal are transmitted to the terminal port 306, to which the field device 201 is connected, via the isolator 305B and are electrically isolated from the other terminal ports 306.

Therefore IJB 200 can transmit and receive the communication signal to/from the field device 201, provide the field device 201 with the electric power, and prevent damage to the field devices 201 connected to the other terminal port 306 and to functions or components in IJB 200 as a result of any electric short circuit.

In addition to the technical effect mentioned above, according to IJB 200 in this embodiment, IJB 200 can perform marshaling i.e. control and check the relationship of the field device 201 and the terminal port 306 it is connected to, thus the control system 205 does not need to manage the terminal port 306 to which the field device 201 is connected. It means that the control system 205 does not have to do marshaling or understand the connection between the field device 201 and the terminal port 306, as it is managed by IJB 200.

Further, the field device 201 can be addressed by the field device reference, and hence the field device 201 can be managed more effectively.

Second Embodiment

The second embodiment according to the present invention is explaining referring to FIG. 9 to FIG. 12. It should be noted that the difference from the first embodiment is mainly explained, and the explanation which is the same as the first embodiment is omitted for purposes of clarity alone, and not as a limitation.

(Overall Configuration of the Field Device Control System)

Figure 9:
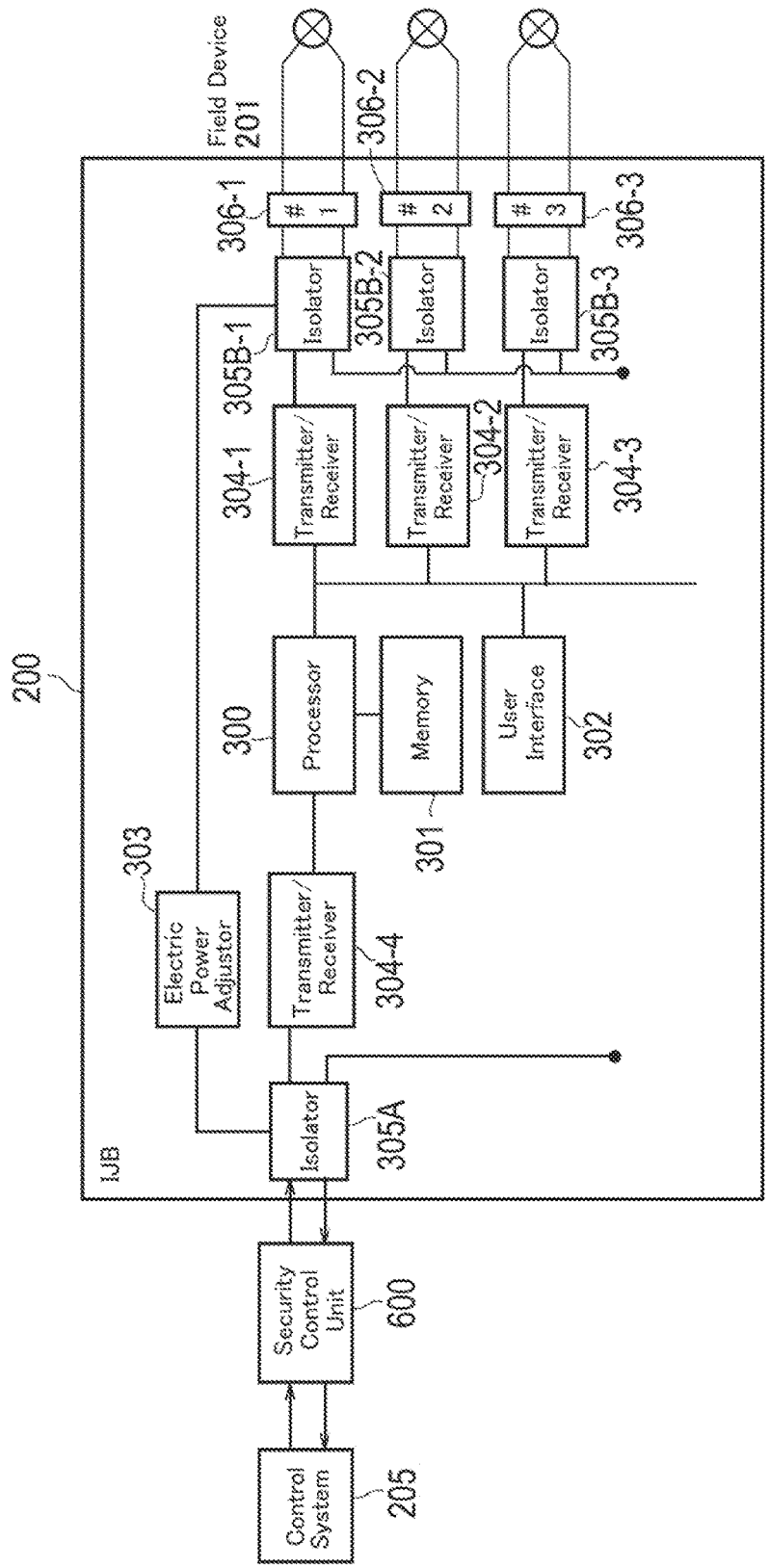
FIG. 9 is a diagram illustrating an overall configuration of a field device control system according to the second embodiment.

The field device control system according to this embodiment is shown in FIG. 9. The field device control system according to this embodiment has a security control unit 600. The security control unit 600 is placed between the control system 205 and IJB 200. The security control unit 600 may be placed between the control system 205 and the PW&HB unit 204 or between the PW&HB unit 204 and the cable duct 202. The security control unit 600 is connected to IJB 200 and to the control system 205 via the cable 206.

The security control unit 600 checks the communication signal and/or the electric power signal to IJB 200 to confirm whether these signals are from authorized sources or not. The sources are any one or more of authorized control systems 205 and maintenance systems 208.

The security control unit 600 has an encryption and/or an integrity protection procedure. The security control unit 600 executes the encryption procedure and/or the integrity protection procedure to the communication signals transmitted and received between the control system 205 and IJB 200.

By providing the encryption procedure and the integrity protection procedure to the communication signal, the communication signal between the control system 205 and IJB 200 are protected from dangers, such as attacks, hacking and so on.

(Structure of Processor)

Figure 10:
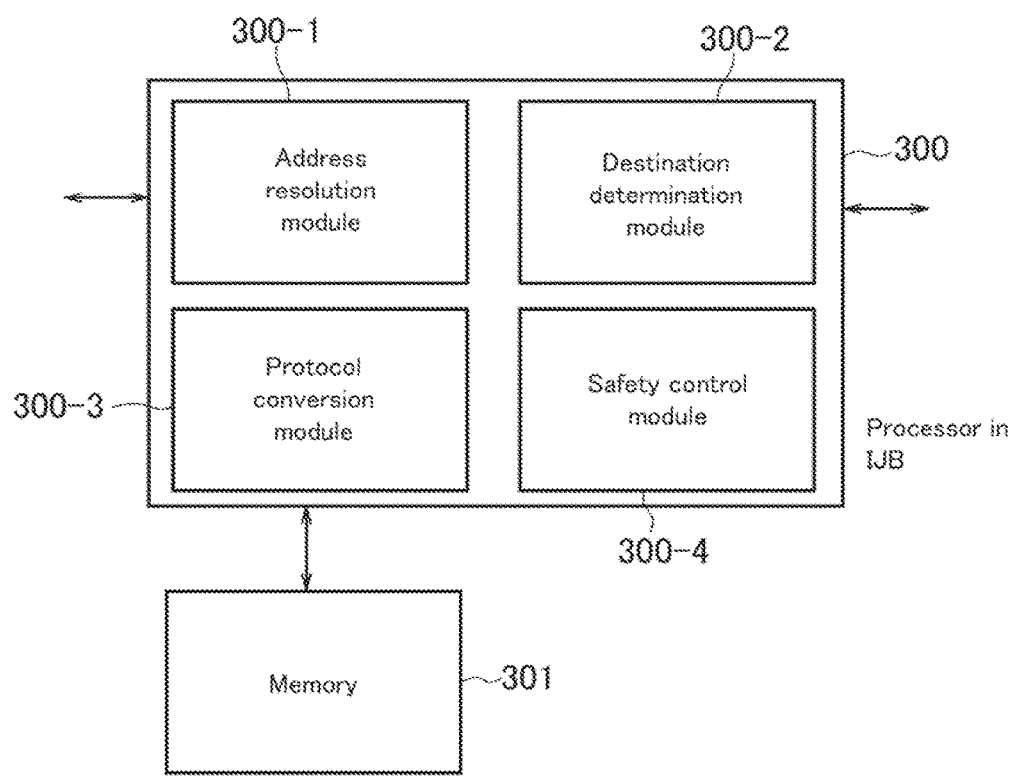
FIG. 10 is a block diagram of an internal structure of a processor in a connection equipment.

The internal structure of the processor 300 according to this embodiment is described in FIG. 10. The processor 300 comprises of an address resolution module 300-1, a destination determination module 300-2, a protocol conversion module 300-3, and a safety control module 300-4.

(Address Resolution Module)

The address resolution module 300-1 resolves a relationship of a field device reference, a unique field device reference and the terminal port 306 to which the field device 201 is connected, by referring to the table in the memory 301.

The address resolution module 300-1 detects the field device reference transmitted from the control system 205.

When the address resolution module 300-1 detects the field device reference transmitted from the control system 205, the address resolution module 300-1 may perform an address resolution to identify the unique field device reference corresponding to the field device reference (e.g. device name, device tag) in the communication signal, referring to the table in the memory 301.

When the unique field device reference is not present in the table kept in the memory 301, following procedures may be executed by the processor 300.

(1) If the received field device reference does not have duplicates in the table stored in the memory 301, no action is required.

(2) If there is more than one field device reference in the table stored in the memory 301 that is same as the received field device reference, the processor 300 sends a command to the control system 205 to resolve the field device reference duplicated. Resolution of the field device reference at the control system 205 may be manual or automatic.

(Destination Determination Module)

The destination determination module 300-2 determines the terminal port 306 to which the communication signal from the control system 205 is transmitted and the destination of the communication signal from the field device 201.

When the communication signal is transmitted from the control system 205 or the maintenance system 208 to the field device 201, the destination determination module 300-2 communicates with the address resolution module 300-1 in order to resolve the terminal port 306 the communication signal is transmitted.

The address resolution module 300-1 checks the table in the memory 301 and informs the destination determination module 300-2 of the terminal port 306 correspondent to the field device reference to which communication signal is to be transmitted. Then the destination determination module 300-2 instructs the transmitter/receiver 304 to transmit the communication signal to the terminal port 306 decided.

When the communication signal is transmitted from the field device 201 to the control systems (205-1, 205-2) or the maintenance system 208, the destination determination module 300-2 may decide the destination referring the table shown in FIG. 11.

The destination determination module 300-2 may determine the destination of the communication signal based on a response of "a source of a request", a response of "a type of a request" from the field device 201, or "a type of a response".

The source of the request is the source from which the request in the form of communication signal to the field device 201 was generated and transmitted i.e. from the control system 205 or the maintenance system 208.

The type of the request is for example request for 'Parameter type or process values', 'Health of field device or status', 'Initialization' and so on. The destination determination module 300-2 is able to identify the control systems 205 and the maintenance system 208 from the type of the request which was transmitted to the field device 201.

The type of the response is the response type from the field device 201. The type of the response is for example values or responses corresponding to 'parameter type or process values', 'Health or Status', 'Initialization complete'.

The destination determination module 300-2 may determine the destination of the communication signal from one or more of the event, type of communication signals to the field device 201, or the response generated by the field device 201.

The destination determination module 300-2 may determine the destination of the communication signal based on a destination list stored in the memory 301. The destination list includes the control systems (205-1, 205-2) and the maintenance system 208 or any other destination systems. An example of the list in the memory 301 is shown in FIG. 11.

The destination determination module 300-2 may instruct the transmitter/receiver 304 to transmit the communication signal to the determined destination.

(Protocol Conversion Module)

The protocol conversion module 300-3 converts a protocol applied between the control system 205 or maintenance system 208 and IJB 200 to a protocol applied between IJB 200 and the field device 201.

The protocol conversion module 300-3 may detect the protocol used in the transmission between the control system 205 or the maintenance system 208 and IJB 200 (e.g. protocol A).

If the protocol A is also applied between IJB 200 and the field device 201, the communication signal received from the control system 205 or the maintenance system 208 is transmitted to the field device 201 through the corresponding terminal port 306 via the transmitter/receiver 304 without any protocol conversion.

On the other hand, if the protocol A is not applied between IJB 200 and the field device 201 (protocol B is applied), the protocol conversion module 300-3 converts the communication signal from the protocol A to the protocol B. Then, the protocol-converted communication signal is transmitted to the field device 201 through the corresponding terminal port 306 via the transmitter/receiver 304.

(Safety Control Module)

The safety control module 300-4 prevents the electric power of the field device 201 from exceeding a predetermined safety level (Psafe). Psafe is a value considering a safe margin from the maximum limit (Pmax) of power.

The safety control module 300-4 may check the electric power level at each terminal port 306 continuously or at predetermined intervals.

Figure 12:
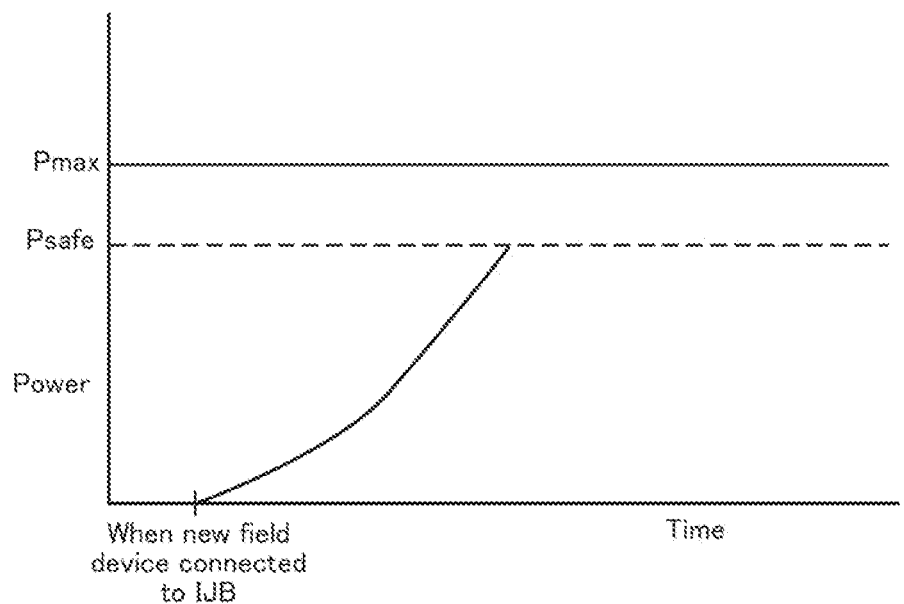
FIG. 12 is a graphic chart according to the second embodiment.

When a new field device 201 is connected, and the safety control module 300-4 detects that the electric power is approaching to a safety limit (Psafe), as shown in FIG. 12, the safety control module 300-4 may disable the terminal port 306 to which the new field device 201 is connected, may update the table in memory 301 (for example, to remove the entries of field device reference and/or unique fiend device reference, field device type corresponding to the disabled terminal port) and send a notification signal to the user interface 302 in IJB and/or the control system 205 indicating that the respective terminal port 306 has been disabled, for safety reasons.

The disabled terminal port 306 would not be made available for use until that field device 201 is disconnected. Subsequently no further communication signal from the control system 205 can be transmitted to that field device 201.

Other Embodiments

The embodiment described above, the connecting equipment connected to the field device and the control system, and the field device control system for controlling the field device from the control system via the connection equipment are explained. However, the present invention is not limited to the embodiment described above. And the present invention can be modified within the scope of the present invention as would be understood by a person skilled in the art.

In the embodiments described above, as an example, IJB 200 implemented in "Junction Box", is explained. IJB 200 is not required to be a form of "box". It should be noted that IJB 200 can be achieved by equipment which connects the control system 205 via the cable 206 and connects the field device 201 via the terminal port 306.

In the embodiments described above, the case that the communication signal from the control system 205 and the electric power signal from PW & HB unit 204 are combined in the same cable 206 and are transmitted to IJB 200, are explained. It should be noted that the communication signal and the power signal can be transmitted by different cables.

IJB 200 may be configured to allow peer to peer communication between the field devices 201 rather than broadcasting the communication signals to the field devices 201 (e.g. scan or cyclic broadcasting).

In the embodiments above, the cases wherein the communication signal is transmitted and received between the control system 205 and the field device 201 are described. It should be noted that the communication signal is able to be transmitted and received between the maintenance system 208 and the field device 201 in the same way as described in the embodiments above.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

INDUSTRIAL APPLICABILITY

The connection equipment and the field device control system according to this invention can reduce the overall operational cost, can omit the marshaling board, is not necessary to manage the terminal port to which the field device is connected from the control room, and can limit the influence of electrical short circuit to a certain scope.

The invention claimed is:

1. A connection equipment connected to a field device via one of a plurality of terminal ports, the field device controlled by a control system connected to the connection equipment, the connection equipment comprising:
    a transmitter/receiver;
    a first isolator circuit configured to receive a first communication signal from the control system via the transmitter/receiver, to split the received first communication signal and an electric power signal to be provided to the field device, and to transmit the received first communication signal to processing circuitry and the electric power signal to an electric power adjustor circuit;
    the processing circuitry configured to receive the first communication signal from the control system via the first isolator circuit, to determine the terminal port from among the plurality of terminal ports based on a field device reference included in the received first communication signal, and to instruct the transmitter/receiver to transmit the received first communication signal to the field device via the determined terminal port by transmitting the first communication signal to a second isolation circuit;
    the electric power adjustor circuit configured to adjust a level of the electric power signal to be provided to the field device via the determined terminal port based on an input level of the electric power signal received from the control system using a cable via the first isolator circuit, and to transmit the electric power signal to the second isolator circuit; and
    the second isolator circuit configured to combine the first communication signal received from the processing circuitry and the electric power signal received from the electric power adjustor circuit, and to electrically isolate the first communication signal to be transmitted to the field device via the determined terminal port and the electric power signal to be provided to the field device via the determined terminal port, from rest of the plurality of terminal ports.

2. The connection equipment according to claim 1, further comprises a memory configured to store a table configured to associate the field device reference of the field device with an identification of the one of the plurality of terminal ports to which the field device is connected.

3. The connection equipment according to claim 2, wherein
    the processing circuitry is configured to detect an establishment of a connection of the field device to the terminal port and an occurrence of a disconnection of the field device from the terminal port; and the memory is configured to receive instruction from the processing circuitry to update the table stored according to the establishment of the connection and the occurrence of the disconnection detected by the processing circuitry.

4. The connection equipment according to claim 3, wherein
    the processing circuitry is configured to detect the establishment of the connection and the occurrence of disconnection, when a level of at least one of electric current, electric voltage or electric power at the terminal port is changed.

5. The connection equipment according to claim 3, wherein
    the memory is configured to store a history of the establishment of the connection and the occurrence of the disconnection; and
    the processing circuitry is configured to report the history to the control system.

6. The connection equipment according to claim 2, wherein
the memory is configured to manage a unique field device reference, which is uniquely allocated to the field device before a shipment of the field device, in addition to the field device reference in the table.

7. The connection equipment according to claim 1, wherein
the processing circuitry is configured to determine a transmission destination of a second communication signal received from the field device via the terminal port, based on the one or more of the plurality of the terminal ports, a source of the first communication signal transmitted to the field device, a type of a request transmitted to the field device, or a type of a response generated by the field device.

8. The connection equipment according to claim 1, wherein
the processing circuitry is configured to communicate with the control system at a first communication speed, and to communicate with the field device at the second communication speed which is different from the first communication speed.

9. The connection equipment according to claim 1, wherein
the electric power adjustor circuit is configured to increase a power level of the received electric power signal to a predetermined power level, which is required by the field device.

10. The connection equipment according to claim 1, wherein
the second isolator circuit is configured to electrically isolate the cable and the terminal port.

11. The connection equipment according to claim 1, wherein the electric power adjustor circuit is provided between the first isolator circuit and the second isolator circuit.

12. The connection equipment according to claim 1, wherein the processing circuitry is provided between the first isolator circuit and the second isolator circuit.

13. A field device control system for controlling a field device from a control system via a connection equipment, and providing an electric power signal to the connection equipment comprising:
the control system comprising:
first processing circuitry configured to generate a communication signal including an field device reference of the field device; and
a first transmitter/receiver configured to transmit the communication signal; and
the connection equipment comprising:
a memory configured to store a table for associating the field device reference of the field device with an identification of a terminal port;
a first isolator circuit configured to receive the communication signal from the control system via a second transmitter/receiver, to split the received communication signal and an electric power signal to be provided to the field device, and to transmit the received communication signal to second processing circuitry and the electric power signal to an electric power adjustor circuit;
the second processing circuitry configured to determine the terminal port corresponding to the field device reference included in the communication signal received from the control system based on the table, and to instruct the second transmitter/receiver to transmit the communication signal to the determined terminal port by transmitting the communication signal to a second isolation circuit;
the second transmitter/receiver configured to transmit the received communication signal received from the second processor to the field device via the determined terminal port based on the instruction by the second processor;
the electric power adjustor circuit configured to adjust a level of the electric power signal to be provided to the field device via the determined terminal port based on an input level of the electric power signal received using a cable via the first isolator circuit, and to transmit the electric power signal to the second isolator circuit; and
the second isolator circuit configured to combine the communication signal received from the second processing circuitry and the electric power signal received from the electric power adjustor circuit, and to electrically isolate the communication signal to be transmitted to the field device via the determined terminal port and the electric power signal to be provided to the field device at the determined terminal port, from the other terminal ports.

14. The field device control system according to claim 13, further comprises
a security control circuit placed between the connection equipment and the control system, and connected to the connection equipment and the control system via a cable.

15. The field device control system according to claim 14, wherein the security control circuit is configured to check if the communication signal transmitted to the connection equipment is from authorized sources.

16. The field device control system according to claim 14, wherein
the security control circuit is configured to encrypt the communication signal transmitted and received between the control system and the connection equipment.

17. A connection equipment connected to a field device via one of a plurality of terminal ports, the field device controlled by a control system connected to the connection equipment, the connection equipment comprising:
a transmitter/receiver;
a first isolator circuit configured to receive a communication signal from the control system via the transmitter/receiver, to split the received communication signal and an electric power signal to be provided to the field device, and to transmit the received communication signal to processing circuitry and the electric power signal to an electric power adjustor circuit;
the processing circuitry configured to:
receive the communication signal from the control system via the first isolator circuit;
resolve a relationship of a field device reference of the field device and an identification of the terminal port to which the field device is connected, by referring to a table stored in a memory of the connection equipment;
determine the terminal port to which the communication signal from the control system is to be transmitted based on the field device reference included in the communication signal; and
convert a protocol applied to the communication signal between the control system and the connection equipment into a protocol applied to the communication signal between the connection equipment and the field device;

the electric power adjustor circuit configured to adjust a level of the electric power signal to be provided to the field device via the determined terminal port based on an input level of the electric power signal received from the control system using a cable via the first isolator circuit, and to transmit the electric power signal to the second isolator circuit; and the second isolator circuit configured to combine the communication signal received from the processing circuitry and the electric power signal received from the electric power adjustor circuit, and to electrically isolate the communication signal to be transmitted to the field device via the determined terminal port and an electric power signal to be provided to the field device via the determined terminal port, from rest of the plurality of terminal ports.

18. The processor according to claim 17 comprising:
a safety control circuit configured to disable the terminal port to which the field device is connected, when the field device is connected to the terminal port and an electric power to the terminal port is determined to approach a predetermined safety level.

* * * * *